United States Patent [19]

Volk, Jr.

[11] Patent Number: 4,955,270
[45] Date of Patent: Sep. 11, 1990

[54] DRY FLOW SENSOR

[75] Inventor: Joseph A. Volk, Jr., Creve Coeur, Mo.

[73] Assignee: Beta Raven Inc., Earth City, Mo.

[21] Appl. No.: 361,795

[22] Filed: May 30, 1989

Related U.S. Application Data

[63] Continuation of Ser. No. 98,799, Sep. 21, 1987, abandoned.

[51] Int. Cl.$^5$ .............................................. G01F 1/30
[52] U.S. Cl. ................................ 73/861.71; 73/861.73
[58] Field of Search ............ 73/861.71, 861.73, 861.74

[56] References Cited

U.S. PATENT DOCUMENTS

| | | | |
|---|---|---|---|
| 2,571,863 | 10/1951 | Godsey, Jr. | 73/861.71 |
| 2,605,638 | 8/1952 | Pearson . | |
| 2,632,329 | 3/1953 | Zuehlke | 73/861.74 |
| 2,702,186 | 2/1955 | Head et al. . | |
| 2,775,890 | 1/1957 | Waldron . | |
| 2,976,734 | 3/1961 | Gindes et al. . | |
| 3,096,646 | 7/1963 | Peirce . | |
| 3,138,955 | 6/1964 | Uttley . | |
| 3,295,803 | 1/1967 | Webb . | |
| 3,372,579 | 3/1968 | Hobel et al. . | |
| 3,530,714 | 9/1970 | Akeley | 73/861.75 |
| 3,640,135 | 2/1972 | Tomiyasu et al. | 73/861.73 |
| 3,680,357 | 8/1972 | Clusener . | |
| 4,063,456 | 12/1977 | Jonkers | 73/861.73 |
| 4,067,238 | 1/1978 | Oetiker | 73/861.73 |
| 4,069,709 | 1/1978 | Volk et al. | 73/861.73 |
| 4,091,680 | 5/1978 | Block . | |
| 4,238,956 | 12/1980 | Sniezek et al. . | |
| 4,440,029 | 4/1984 | Tomiyasu et al. | 73/861.73 |
| 4,470,292 | 9/1984 | DeClark et al. | 73/861.73 |
| 4,538,471 | 9/1985 | Volk, Jr. et al. | 73/861.73 |
| 4,543,835 | 10/1985 | Volk, Jr. et al. | 73/861.73 |
| 4,550,619 | 11/1985 | Volk, Jr. et al. | 73/861.73 |
| 4,604,753 | 8/1986 | Sawai | 372/29 |
| 4,637,262 | 1/1987 | Vesa | 73/861.73 |
| 4,678,424 | 7/1987 | Volk, Jr. et al. . | |
| 4,703,659 | 11/1987 | Lew | 73/189 |
| 4,718,284 | 1/1988 | Pfeiffer | 73/861.73 |
| 4,718,285 | 1/1988 | Pfeiffer | 73/861.73 |
| 4,719,805 | 1/1988 | Volk, Jr. et al. | 73/861.73 |

FOREIGN PATENT DOCUMENTS

| | | |
|---|---|---|
| 131194 | 6/1902 | Fed. Rep. of Germany . |
| 263191 | 11/1970 | U.S.S.R. . |
| 804211 | 11/1958 | United Kingdom . |
| 1066568 | 4/1967 | United Kingdom . |

Primary Examiner—Hezron E. Williams
Assistant Examiner—Robert P. Bell
Attorney, Agent, or Firm—Rogers, Howell & Haferkamp

[57] ABSTRACT

A dry flow sensor for detecting the flow rate of a stream of granular material through a chute includes a force transducer mounted inside an enclosure, the enclosure being mounted by a bracket assembly to the chute with a plate assembly cantilever mounted in the chute from the force transducer and a thermoelectric heat pump to maintain the temperature of the force transducer at a desired value. A temperature sensor is mounted on the force transducer and a computer compares actual with desired temperature to control the heat pump. The cantilever mount comprises a pair of beam members, each beam including a central threaded rod with a hollow tube surrounding the rod and held in place between the force transducer and plate assembly by compression. A collar member surrounds one beam member and has a plurality of adjustment screws to limit radial torquing of the beam and plate assembly with respect to the force transducer. A second force transducer is loaded with a counterweight substantially equal to the dynamic load on the first transducer, their outputs being summed to cancel out the effect of vibrational forces in the chute from the detected force.

32 Claims, 4 Drawing Sheets

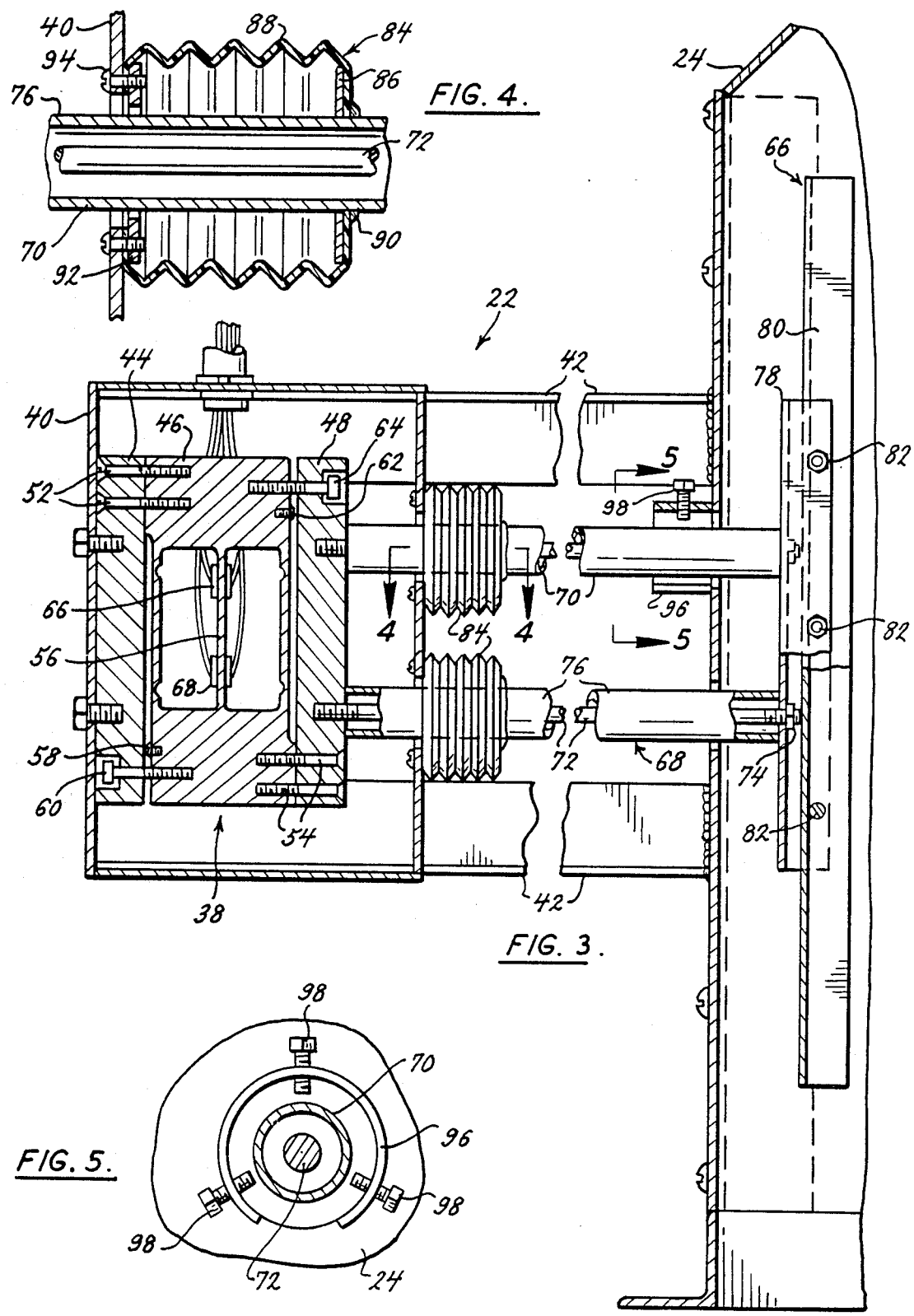

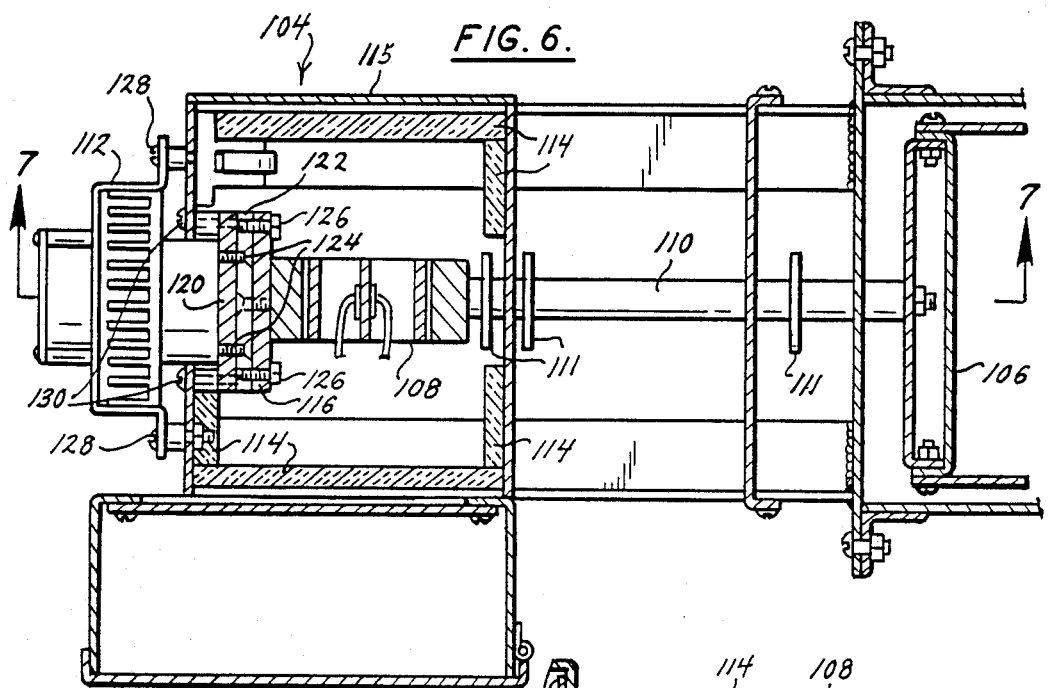
FIG. 6.
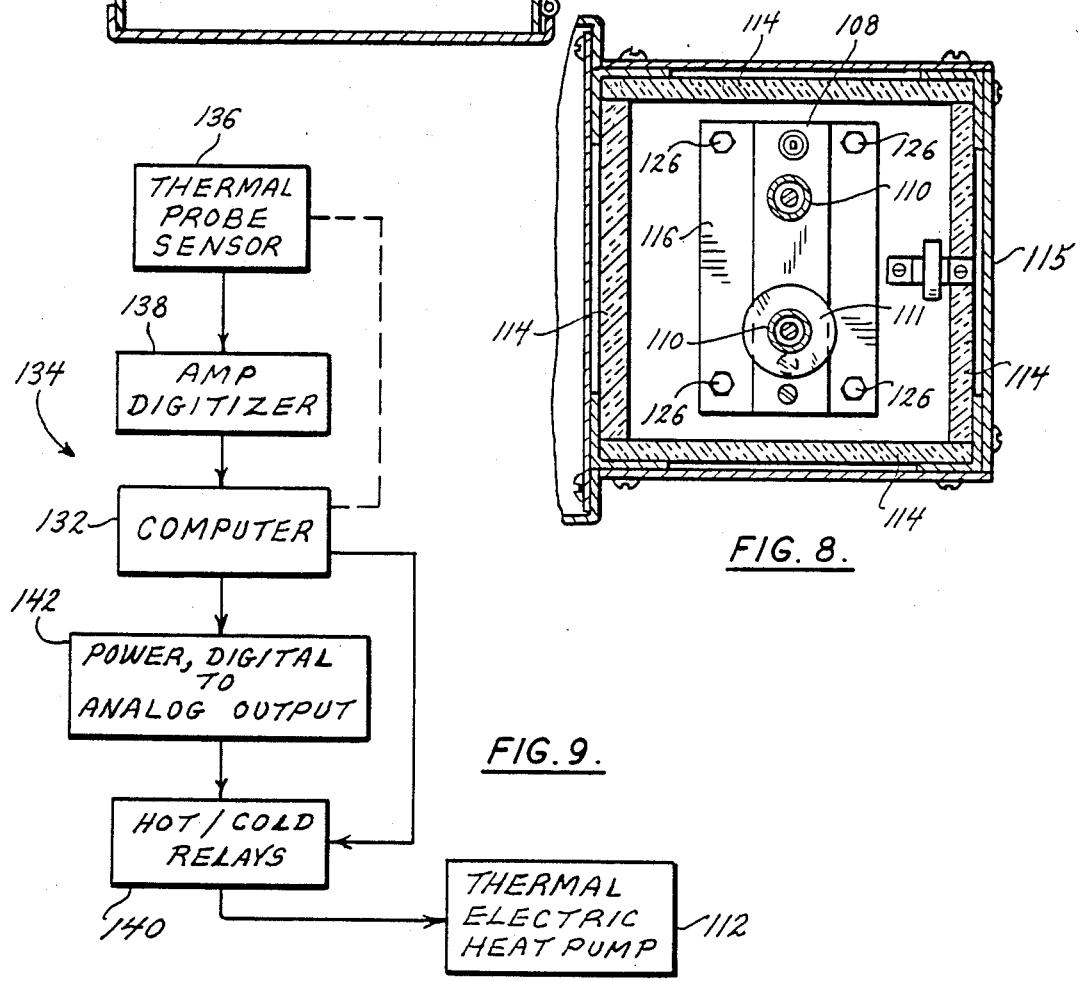
FIG. 8.
FIG. 9.

DRY FLOW SENSOR

This is a continuation of co-pending application Ser. No. 098,799, filed on Sept. 21, 1987, now abandoned.

BACKGROUND AND SUMMARY OF THE INVENTION

Devices for measuring the flow rates of powdery and granular materials as they flow through a gravity flow system comprised of chutes are well known in the art. The inventor herein is either the sole or co-inventor of several such prior art devices as shown in U.S. Pat. Nos. 4,069,709; 4,538,471; 4,543,835; and 4,550,619, the disclosures of which are incorporated herein by reference. The inventor is also aware of other patents for such devices, one of which is U.S. Pat. No. 4,440,029. These patents generally disclose flow rate sensors which include a plate which is placed in the flow path of the material, the plate being supported in some manner from the chute with a force transducer of some sort mounted to the chute or other support and coupled to the plate to detect the force of the material as it impacts the plate. This detected force is then used as a measure for the flow rate. Although many of the plates in the prior art are mounted at an incline with the material dropping vertically onto the plate, at least one as shown in U.S. Pat. No. 4,440,029 is vertically mounted with the material flowing at an angle into the plate.

Because of the wide variance in the size and weight of the plate, there are many different kinds of plate suspension systems utilized in the prior art. These vary in complexity from a single strip spring support for hanging the vertical plate of U.S. Pat. No. 4,440,029 to the leaf springs as shown in the inventor's prior U.S. Pat. No. 4,550,619. However, the universal approach was to support the plate from the chute or other surrounding stationary structure and to do so in as friction free a manner as possible.

In the prior art, it was thought that supporting the plate from the chute or other surrounding stationary structure would help to improve the accuracy of the measurement made by the force transducer by minimizing the effect of the plate mass on the force transducer measurement. Ideally, it was thought that elimination of this effect would result in a force reading based solely on the mass of the material which impacted the plate. Therefore, a significant amount of inventive effort was spent in devising various suspensions which attempted to achieve a frictionless support for the plate, with the force transducer being coupled directly to the plate but not serving in any manner to support the weight of the plate. Although many different approaches were taken in the prior art, inherent limitations in creating a frictionless support, and maintaining its adjustment as it operated, were a constant source of error in the flow rate reading.

It is further noted that, to the best of the inventor's knowledge and experience, little or no effort was made to control the temperature at which the flow rate sensor operated. For a large number of applications, the flow rate sensor would be mounted in an environment which did not have a controlled temperature such that a temperature differential of 40° F. or even more could be experienced between a mid-afternoon and a middle of the night run of material. While the force transducer which was typically used in a flow rate device had a fairly accurate output, and that output would be subject to only a minimal variation over what may otherwise be considered to be a wide operating temperature range, for those applications requiring greater accuracy the temperature variation did introduce a significant error. This is caused by several factors.

First of all, it is not uncommon for a force transducer to be utilized in a flow rate sensor which operated at values much less than the full scale reading for the force transducer. Typically, the offset error due to temperature was expressed as a small percentage of the full scale reading. While this error may not be significant if the force transducer is being utilized at its full scale reading, it becomes quite significant for those applications and flow rates for which the force transducer operates at half or less of its full scale reading, as is typical. Thus, for low flow rates, the inaccuracies introduced by the temperature factor become significant.

Still another aspect of the temperature offset is the fact that the offset varies as the temperature varies, although that variation is generally within the rated range of the device. For example, the temperature offset introduced by operating the force transducer at 30° F. can and usually does differ from the offset introduced by operating the force transducer at 70° F. Therefore, the flow rate of the device can be calibrated while the ambient temperature is at 30° F. to eliminate the temperature offset, but this calibration is lost when the temperature changes from that 30° F. to some other temperature. Thus, an operator may calibrate a flow rate sensor at one temperature, thereby believing that he has eliminated the all extraneous effects from the device, and the device may then shift out of calibration merely through a change in the ambient temperature. Recalibration at the second ambient temperature may temporarily eliminate the temperature offset again, but a return to the previous ambient temperature reintroduces that temperature offset. As might be expected, this can be a frustrating experience for an operator who is not aware of or does not recognize that the flow rate device is designed to utilize a force transducer at only a small portion of its full scale reading such that the temperature offset represents a significant error for low flow rates.

To solve these and other problems of the prior art, the inventor herein has taken a different approach by mounting and suspending the sensing plate directly from the force transducer, there being no other coupling or supporting mechanism connecting the sensing plate to the surrounding chute or other support structure. In effect, the inventor has cantilevered the plate from the force transducer into the chute and in the path of the stream of flowing material. By doing so, the suspension system for the plate which, in the prior art, coupled it to the chute or other support has been completely eliminated, along with the inherent mechanical limitations necessarily present in those suspensions.

More specifically, a pair of beam members cantilever mount the plate directly from the force transducer. These beam members are each generally comprised of a threaded rod which is screwed into the force transducer at one end and coupled to the plate at the other end with a nut. A tube, which could be a length of conduit, surrounds the threaded rod and is compressed between the plate and the force transducer by the force of the nut being tightened onto the rod. This tube provides additional strength and stability. The plate itself is comprised of a pair of pans which are nested together and attached along their edges such that the inner pan is connected to the beam members, and the outer pan is completely flat and smooth. It is this outer pan which is presented to the stream of granular material and acts as a replaceable wear surface. A collar member surrounds one of the beam members and includes several adjusting screws which permit adjustment of clearance between the beam member and the collar. The collar serves as a mechanical limit or stop to prevent excessive damage to the unit should the plate or beam members go out of alignment, or upon failure of the force transducer. The force transducer is mounted in an enclosure, with the beam members extending through the sidewall of the enclosure. To seal the enclosure from dust and other environmental conditions, a pair of dust seals are mounted to the enclosure and the tubes, the dust seals having a bellow-like construction to permit unrestricted reciprocating movement between the beam members and the enclosure as the dry flow sensor operates. The enclosure is mounted to the chute by brackets, so that there is a rigid connection between the force transducer, its enclosure, and the chute.

In order to eliminate the temperature offset problems, in a second embodiment the inventor has enclosed the force transducer in an insulated enclosure, and mounted it directly to the cold plate of a solid state thermoelectric heat pump. A temperature sensor is recess mounted in the force transducer and a control utilizing a computer and a set of relays senses the temperature of the force transducer, compares it with a desired temperature as input by an operator, selects either heat or cool by switching the proper relays, and then powers the thermoelectric cooler with a variable voltage to select just the correct amount of heating or cooling required to bring the temperature of the force transducer back to its desired level.

As a further feature of the dry flow sensor of the present invention, a second force transducer may be mounted in the enclosure and loaded with a counterweight substantially equal to the dynamic load of the first force transducer. Thus, the output of the second force transducer is representative of the vibrational forces in the chute which are also induced in the first force transducer. Although in the prior art mention is made of compensating for vibrational forces, with other designs utilizing plates suspended directly from the chute, these vibrational forces were induced through the plate suspension as well as the force transducer mounting, with possibly some interaction between them. Therefore, with prior art designs it was not readily discernible how to accurately reproduce these vibrational forces, and compensate for them due to the use of multiple suspensions for various portions of the dry flow sensor. However, in the present design wherein the plate is supported directly from the force transducer with no other connection being made to the surrounding structure, the effect of these vibrational forces may be very accurately reproduced by hanging a dummy load substantially equal to the plate and beam support members directly from a second force transducer. The output of these two force transducers may then be summed to subtract out the inaccuracies in the force measurement caused by forces other than the impacting stream of material against the plate. Of course, the dummy load can be scaled down and the output may be multiplied to determine the correction factor or, the second force transducer may even be outfitted with a second plate and beam suspension.

While some of the principle advantages and features of the present invention have been described above, a more thorough understanding may be gained by referring to the drawings and description of the preferred embodiments which follow.

BRIEF DESCRIPTION OF THE DRAWINGS

FIG. 3 is a cross-sectional view taken along the plane of line 3—3 in FIG. 2 detailing the force transducer, beam members, and plate assembly of the dry flow sensor;

FIG. 4 is a cross-sectional view taken along the plane of line 4—4 in FIG. 3 and detailing the bellows-like dust seal between a beam member and the enclosure;

FIG. 5 is a cross-sectional view of the beam member with collar stop;

FIG. 6 is a partial cross-sectional view of a second embodiment of the dry flow sensor of the present invention utilizing a thermoelectric heat pump;

FIG. 8 is a cross-sectional view taken along the plane of line 8—8 in FIG. 7 detailing the force transducer mounting to the thermoelectric heat pump; and FIG. 9 is a block diagram of the heat pump temperature control.

DETAILED DESCRIPTION OF THE PREFERRED EMBODIMENT

Figure 1:
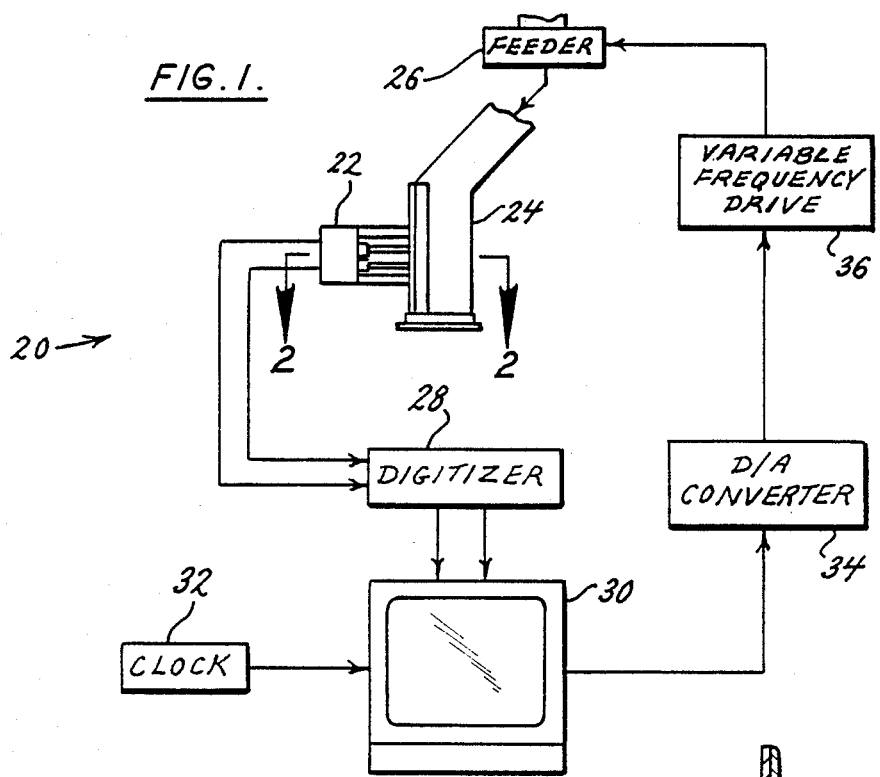
FIG. 1 is a schematic diagram of a control system utilizing a dry flow sensor.

As shown in FIG. 1, a dry flow sensor system 20 may be comprised of a dry flow sensor unit 22 which is mounted to a chute 24 through which a stream of granular material is fed by a feeder 26. The output, which is typically analog, may be converted to a digital signal by a digitizer 28 and fed to a computer 30 which may have a timing source 32 which it utilizes to calculate a flow rate for material. The computer 30 may then control the amount of dry material flowing through the chute 24 by producing a digital output signal to a D/A converter 34 which, in turn, controls a variable frequency drive 36 to speed up or slow down the feeder 26 and thereby control the flow of material.

Figure 2:
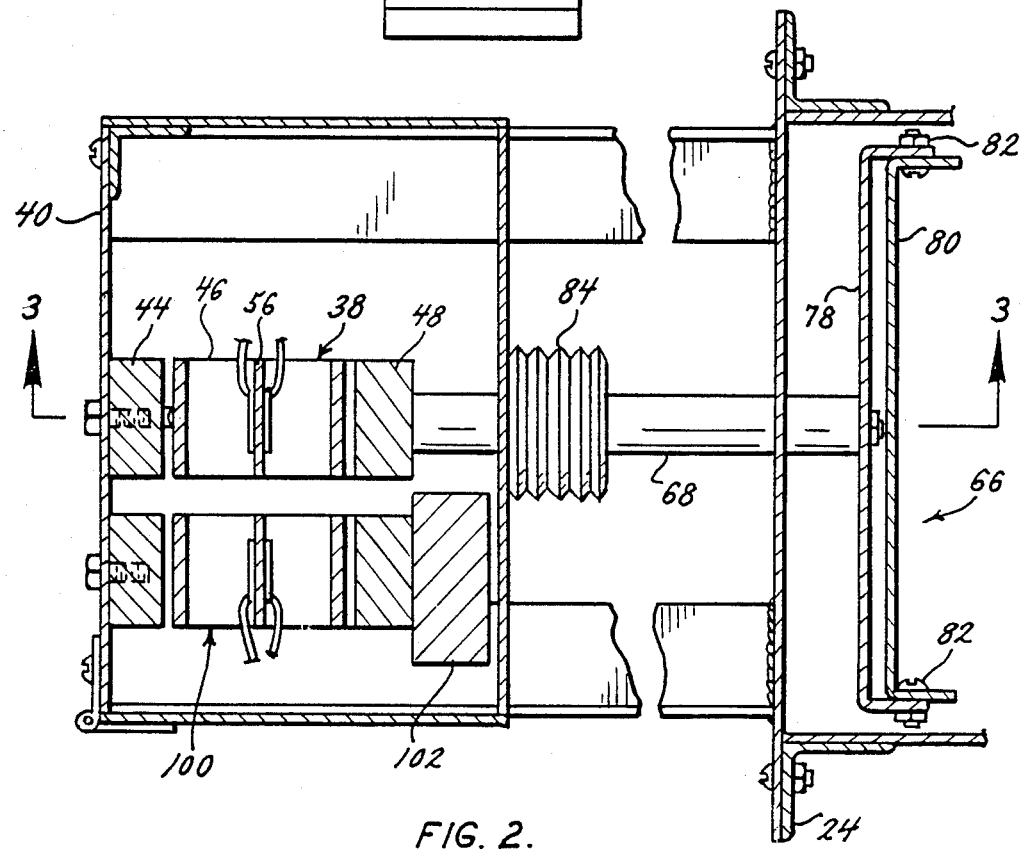
FIG. 2 is a partial cross-sectional view taken along the plane of line 2—2 in FIG. 1 detailing the general construction of the dry flow sensor of the present invention.

The improved dry flow sensor 22 of the present invention is best shown in FIGS. 2 and 3 and includes a first force transducer 38 mounted in an enclosure 40, the enclosure 40 being supported from the sidewall of chute 24 by a plurality of bracket members 42. The force transducer 38 is generally comprised of three block assemblies 44, 46, and 48. As best shown in FIG. 3, a pair of screws 52 attach the upper ends of blocks 44, 46 in close proximity. Similarly, a pair of screws 54 attach blocks 46, 48 at their lower ends in close proximity. Parts of block 46 ar machined away such that there is clearance between it and blocks 44, 48 at the alternate ends thereof, thereby permitting limited relative movement therebetween when a force directly perpendicular to beam 56 impinges on block 48. The amount of travel between adjacent blocks 46 and 44, 48 is limited by a stop screw 58 and countersunk screw 60 at the lower end and through a similar arrangement with stop screw 62 and countersunk screw 64 at the upper end. The output of force transducer 38 is produced by strain gauges 66, 68 which are mounted on beam 56. This force transducer is commercially available from Hottinger Baldwin Measurements.

As seen from the construction of force transducer 38, it is inherently limited to travel in the horizontal direction as shown in the drawing Furthermore, its construction provides enough resistance to radial torquing that it is capable of supporting a plate assembly 66 through a pair of cantilever beam members 68, 70. Cantilever beam member 68 is the same as cantilever beam member 70 and thus, only one such beam member shall be described. Beam member 68 is comprised of an interior threaded rod member 72 which is screwed into block 48 of force transducer 38. At its outer end, a nut 74 is threaded onto threaded rod 72 to attach the plate assembly 66 thereto with a tubular member 76 surrounding threaded rod 72 and being held in place through the compression between plate assembly 66 and block 48. Thus, tube member 76 provides additional stability and strength to beam member 68, and also serves as a spacer to hold the plate assembly 66 at a predetermined distance from the force transducer 38.

The plate assembly 66 is generally comprised of a pair of plates or pans 78, 80 which are nested within each other and held together by a plurality of nut and bolt assemblies 82. The inner plate or pan 80 provides the wear surface against which the stream of granular material impacts, and is therefore smooth and flat. The outer plate or pan 78 has a pair of holes for receiving the ends of threaded rods 72 as necessary for securing the plate assembly 66. As best shown in FIG. 2, there is some spacing provided between pans 78, 80 to accommodate the nut 74 and end of threaded rod 72.

A pair of dust seals 84 surround the two beam members 68, 70 at the enclosure 40 and seal it from the entry of dust or other contaminates. The dust seal 84 is best shown in greater detail in FIG. 4. It includes an outer washer member 86 which is directly secured, along with a bellows member 88 by a bead of RTV 90, or some other similar fixative. At the inboard end, a second metal washer 92 surrounds tube member 76, but does not touch it to provide free movement therebetween. One or more screws 94 secure metallic washer 92 and the inboard end of bellows 88 to the sidewall of enclosure 40. As shown in FIG. 4, the bellows-like device 88 permits limited free movement between the beam 70 and the enclosure sidewall 40 while sealing it at both ends, thereby preventing the entry of contaminates to the interior of enclosure 40.

As best shown in FIG. 5, an annular collar member 96 substantially surrounds upper beam member 70 and is welded to the chute 24. Three adjustment screws 98 are placed around the periphery of collar 96 to permit adjustment of the clearance therebetween. Collar 96 and screws 98 therefore mechanically limit the downward deflection of beam member 70 to protect the force transducer 38 from damage due to excessive radial movement of plate assembly 66 and beam members 68, 70.

As shown in FIG. 2, a second force transducer 100 may be mounted inside enclosure 40 and loaded with a counterweight 102 substantially equal to the dynamic load on force transducer 38. This dynamic load is comprised of the plate assembly 66 and beam members 68, 70. As shown in FIG. 1, the outputs from both force transducers 38, 100 may be utilized in the control circuit 20 to cancel out that portion of the detected force which results from vibrational forces in the chute 24, or which are otherwise not attributable to the impacting of material against plate assembly 66. As an alternative, counterweight 102 may be scaled and the output of force transducer 100 adjusted accordingly, or a second plate and beam assembly may be used in place of counterweight 102.

Figure 7:
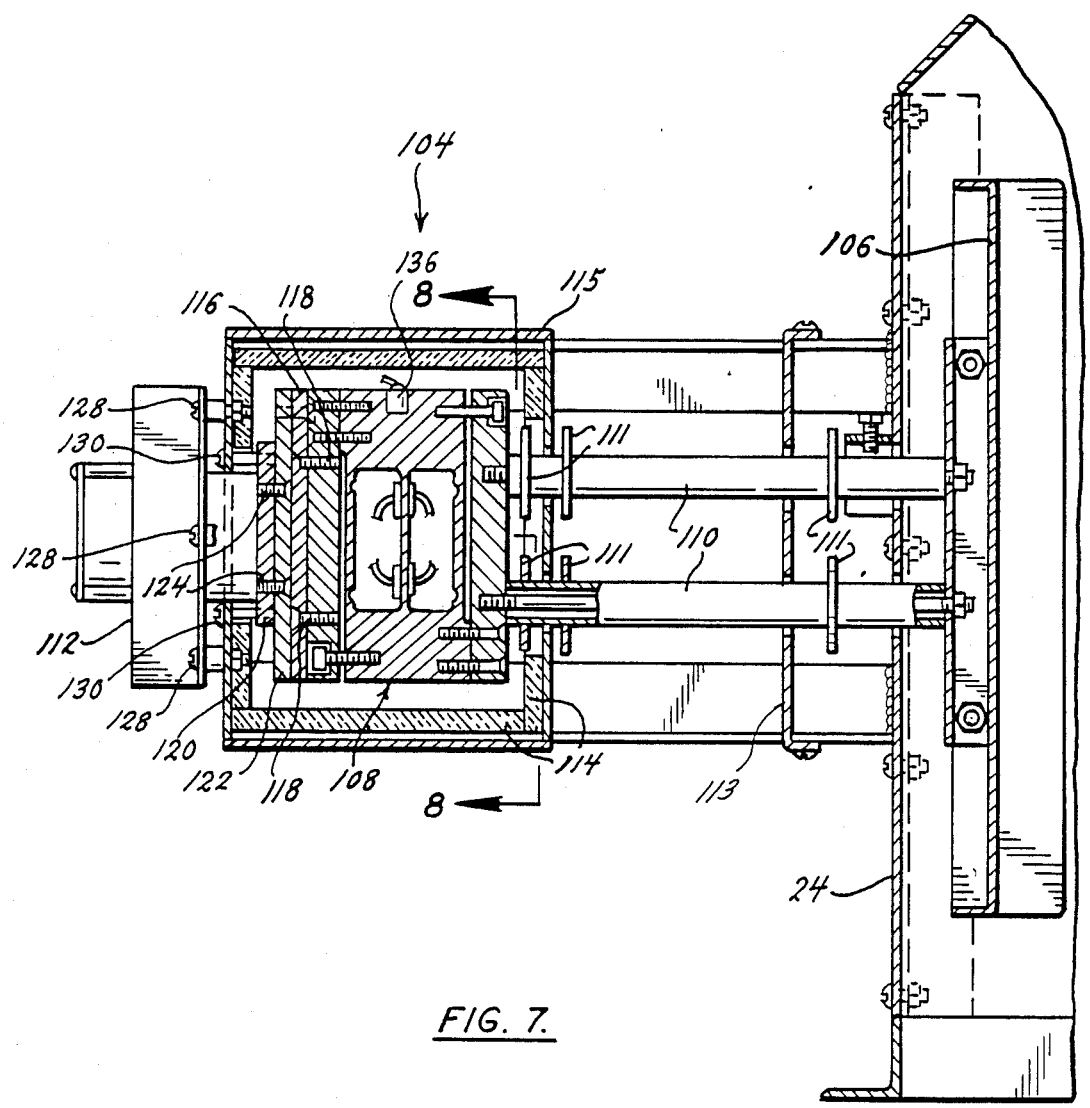
FIG. 7 is a partial cross-sectional view taken along the plane of line 7—7 in FIG. 6 and detailing the side view of the second embodiment.

A second embodiment 104 of the dry flow sensor of the present invention is shown in FIGS. 6-8, and includes many of the same details of construction of the first embodiment. Essentially, a substantially vertically aligned plate assembly 106 is cantilever mounted from the movable portion of a force transducer 108 by a pair of beam assemblies 110. Additionally, dust shields 111 are mounted to beam assemblies 110 instead of dust seals 84, and a slightly different plate assembly 106 is shown. Also, a heat shield 113 is mounted between the chute 24 and the dry flow sensor 104 to minimize the transfer of heat therebetween. However, the key difference is that the force transducer 108 is mounted to a thermoelectric heat pump 112, and layers of insulation 114 are used to line the enclosure 116 in order to help regulate the temperature of force transducer 108. As best shown in FIGS. 6, 7 and 8, force transducer 108 is mounted to an adapter plate 116 by four countersunk screws 118. Similarly, the cold plate 120 of heat pump 112 is mounted to an adapter plate 122 by four countersunk screws 124. Adapter plates 116, 122 are held together by four screws 126 as shown in FIG. 8. Six bolt and spacer assemblies 128 hold the body of heat pump 112 to the enclosure 116. A second set of bolt and spacer assemblies 130 support the cold plate 120 from the enclosure 116. Thus, a very solid and rigid connection is made between the enclosure 116, heat pump 112, and force transducer 108 as is necessary to support the cantilever mount of plate assembly 106 through beams 110 from the movable member of force transducer 108. Although not shown, a second force transducer could be utilized as shown in the first embodiment to eliminate the effects of vibration in the support.

As shown in FIG. 9, a computer 132 is the heart of the control 134 for the heat pump 112. A thermal probe sensor 136 (also shown in FIG. 7) is directly mounted to the force transducer 108 and senses its temperature which is amplified and converted to a digital signal by amplifier/digitizer 138, the output of which is input to computer 132. Computer 132 provides the means by which an operator can input a desired temperature, and it compares the actual temperature with desired temperature and selects from a set of relays 140 whether the heat pump 112 should be operating in a heating or cooling mode. Also, computer 132 produces an output which is amplified and converted to an analog signal by D/A converter and amplifier 142 which powers heat pump 112 to bring the temperature of force transducer 108 back to its desired level.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A device for measuring the flow rate of a stream of granular material comprising a force transducer, a surface, means to mount said surface directly from said force transducer in a cantilever fashion for generally horizontal movement, said surface mounting means having no generally vertical bearing surfaces so that as the stream impacts the surface substantially all of the horizontal component of the force from said impacting stream is transmitted to the force transducer, said force transducer including a movable member, said surface mounting means comprising a pair of rods extending between the movable member and the surface, each rod being secured to the movable member at one end and the surface at the other end, a tubular member surrounding each rod, said tubular members being held in place by compression between the surface and the movable member, and means to mount said force transducer from a support wherein said surface is deflected by the stream of granular material to thereby produce an output of the force transducer corresponding to the flow rate of the granular material.

2. The device of claim 1 wherein said surface is substantially flat and said surface mounting means has means to orient said surface so that it is aligned in a substantially vertical plane.

3. The device of claim 1 further comprising means to mechanically limit the downward deflection of the surface.

4. The device of claim 1 further comprising means to mechanically limit the downward deflection of the surface.

5. The device of claim 4 wherein said limit means comprises a collar assembly at least partially surrounding the beam means, said collar assembly having means to adjust the permissible downward deflection of the surface.

6. The device of claim 1 wherein the stream of material flows through a chute and the force transducer mounting means comprises means for mounting said force transducer to the chute with the surface being suspended inside the chute.

7. The device of claim 6 further comprising a heat shield mounted to the force transducer mounting means.

8. The device of claim 6 further comprising an enclosure for containing said force transducer, said surface mounting means extending through the sidewall of said enclosure, and means for sealing said surface mounting means to said enclosure.

9. The device of claim 1 wherein the stream of material flows through a chute and the force transducer mounting means comprises means for mounting said force transducer to the chute with the surface being suspended inside the chute.

10. The device of claim 9 further comprising a second force transducer, and means mounting said second force transducer from the chute, said second force transducer thereby detecting the vibrational forces in the chute, said second force transducer being loaded with a counterweight substantially equal to the surface and beam means.

11. The device of claim 10 further comprising means to maintain the temperature of the force transducers at a substantially constant temperature to thereby minimize variations in their output.

12. A device for measuring the flow rate of a stream of granular material comprising a force transducer, an enclosure within which the force transducer is mounted, a surface coupled to said force transducer, means mounting said surface in the path of the stream so that the stream impacts said surface, and means to maintain the temperature of said force transducer at a substantially constant temperature by controlling the temperature of the enclosure to thereby minimize variations in its output.

13. The device of claim 12 wherein said temperature maintaining means further comprises means to selectively heat or cool the force transducer.

14. The device of claim 12 wherein said temperature maintaining means further comprises insulation affixed to the interior of the enclosure.

15. The device of claim 14 further comprising a second force transducer, means for mounting said second force transducer from the support, said second force transducer thereby detecting the vibrational forces in the support, and means to combine the output of said first and second force transducers to thereby compensate the indicated flow rate for vibrational forces in the support.

16. The device of claim 13 wherein said heating/cooling means comprises a thermoelectric heat pump.

17. The device of claim 12 wherein said temperature maintaining means further comprises means to at least cool the force transducer.

18. The device of claim 12 wherein the force transducer has a movable member and wherein the surface mounting means comprises means to cantilever mount and support the surface directly from the movable member.

19. The device of claim 13 wherein said temperature maintaining means further comprises means to sense the temperature of the force transducer, and means to control the heating/cooling means in response to the temperature sensor.

20. The device of claim 19 wherein said control means further comprises means for an operator to select a desired temperature, means to compare the output of the temperature sensor with the desired temperature, means to select either heating or cooling in response to said comparison, and means to activate the heating/cooling means to maintain the desired temperature.

21. A device for measuring the flow rate of a stream of granular material through a chute comprising a force transducer, a surface, means to mount the surface solely from the force transducer and in the path of the stream, a thermoelectric heat pump coupled to the force transducer, and means to control the heat pump to thereby maintain the temperature of the force transducer substantially constant.

22. The device of claim 21 wherein the surface mounting means further comprises a pair of beams, the force transducer having a movable member, and the beams extending between the movable member and the surface to thereby mount the surface in cantilever fashion.

23. The device of claim 22 further comprising means to sense the temperature of the force transducer and heat pump wherein the heat pump control means comprises means for an operator to select a desired temperature, means to compare the output of the temperature sensor with the desired temperature, means to select either heating or cooling in response to said comparison, and means to activate the heat pump to maintain the desired temperature.

24. The device of claim 23 further comprising a second force transducer, means mounting said second force transducer from the chute, said second force transducer thereby detecting the vibrational forces in the chute, and means to combine the output of said first and second force transducers to thereby compensate the indicated flow rate for vibrational forces in the chute.

25. A device for measuring the flow rate of a stream of granular material comprising a first force transducer, a surface, means to mount said surface from the first force transducer, a second force transducer, means to mount the flow rate device from a support so that the stream impacts the surface, the output of the first transducer thereby being indicative of the flow rate, said second force transducer being isolated from the stream, and means to combine the output of said first and second force transducers to thereby compensate the indicated flow rate for forces not attributable to the stream of granular material.

26. The device of claim 25 wherein said second force transducer is loaded with a counterweight, said counterweight being substantially the same weight as the dynamic load on the first force transducer.

27. The device of claim 25 further comprising means to maintain the temperature of the force transducers at a substantially constant temperature to thereby minimize variations in their output.

28. The device of claim 25 wherein the surface mounting means further comprises means to support the surface in cantilever fashion from the first force transducer.

29. A device for measuring the flow rate of a stream of granular material comprising a force transducer, a surface, means to mount said surface directly from said force transducer for generally horizontal movement, said surface mounting means having no generally vertical bearing surfaces so that as the stream impacts the surface substantially all of the force is transmitted to the force transducer, a support, means to mount said force transducer from the support wherein said surface is deflected by the stream of granular material to thereby produce an output of the force transducer corresponding to the flow rate of the granular material, a second force transducer, means for mounting said second force transducer from the support, said second force transducer thereby detecting the vibrational forces in the support, and means to combine the output of said first and second force transducers to thereby compensate the indicated flow rate for vibrational forces in the support.

30. The device of claim 29 further comprising means to maintain the temperature of the force transducers at a substantially constant temperature to thereby minimize variations in their output.

31. The device of claim 30 wherein said second force transducer is loaded with a counterweight, said counterweight being substantially the same weight as the movable portion of the dry flow sensor.

32. The device of claim 31 wherein said counterweight is substantially the same weight as the surface and surface mounting means.

* * * * *